United States Patent [19]

Tscherner

[11] 4,216,798
[45] Aug. 12, 1980

[54] ROTARY VALVE

[75] Inventor: Georg W. Tscherner, Chateau Guay, Canada

[73] Assignee: Coleco Industries, Inc., Hartford, Calif.

[21] Appl. No.: 957,863

[22] Filed: Nov. 6, 1978

Related U.S. Application Data

[63] Continuation-in-part of Ser. No. 762,490, Jan. 26, 1977, abandoned.

[51] Int. Cl.² ............................................. F16K 11/06
[52] U.S. Cl. .......................... 137/625.29; 137/625.46; 251/161
[58] Field of Search ...................... 137/625.17, 625.29; 251/161, 162

[56] References Cited

U.S. PATENT DOCUMENTS

| 2,111,169 | 3/1938 | Clark | 137/625.29 |
| 2,311,989 | 2/1943 | McGill | 137/625.29 |
| 2,605,992 | 8/1952 | Daniels | 137/625.29 |
| 3,640,310 | 2/1972 | Erlich | 137/625.46 |

FOREIGN PATENT DOCUMENTS

276975 2/1928 United Kingdom ..................... 251/162

Primary Examiner—Arnold Rosenthal

[57] ABSTRACT

An improved rotary valve includes in combination a fluid distributor in a chamber of the valve, the distributor being rotatable by a handle to select different flow paths for fluid through the valve. The distributor has a surface which is dimensioned and configured to extend along a wall of the chamber containing fluid inlet(s) and outlet(s) and to be biased into fluid sealing contact therewith by biasing means. The handle has adjustable bearing means located therein which bear on a bearing surface on the valve to set spacing between the surface of the distributor and the wall of the chamber, and to determine the amount of shifting of the distributor allowable by pivoting movement of the handle. The bearing means are adjustable to compensate for dimensional variations in the parts, and to compensate for wear thereof.

15 Claims, 6 Drawing Figures

ROTARY VALVE

BACKGROUND OF THE INVENTION

This is a continuation in-part of prior U.S. Patent Application Ser. No. 762,490, filed Jan. 26, 1977, now abandoned.

The present invention concerns multiport rotary valves, more particularly, valves of the type which have a handle which is rotated to rotate a fluid distributor to direct a fluid along different flow paths from one or more fluid inlets to one or more fluid outlets in the valve. Such multiport rotary valves find particular application for use as valves associated with swimming pool filters and the like although it is to be understood that valves in accordance with the invention are not so limited but are applicable to general use as valves for controlling the flow of fluids.

Multiport rotary valves are of course well-known in the art and multiport rotary valves of the type having an externally accessible handle which is employed to rotate a fluid distributor to select different paths of fluid through the valve are known as shown, for example, in U.S. Pat. No. 3,828,932 issued to the assignee of the present application. A similar type valve is also shown in U.S. Pat. No. 3,640,310. As shown by U.S. Pat. No. 3,828,932, such valves are known to include the feature of the fluid distributor being contained within a chamber and having a surface which is seated upon and biased against the wall of the chamber by biasing means such as a spring to effectuate a fluid tight seal between the distributor and the wall. The wall contains one or more fluid inlets and one or more outlets which open to the chamber, and the seated surface of the distributor is dimensioned and configured to extend along the wall and encircle the inlet(s) and outlet(s). The fluid distributor rotates to provide the selection of different fluid flow paths through the valve while remaining seated on the wall which contains the inlet(s) and outlet(s) and rotating thereover.

Usually a gasket is provided between the wall and the distributor surface to enhance fluid-tightness of the seal, as shown in U.S. Pat. No. 3,828,932, the disclosure of which is incorporated by reference herein.

One difficulty associated with such prior art multiport rotary valves is the difficulty of maintaining the proper sealing pressure of the fluid distributor against the ring gasket. If the pressure sealing the fluid flow distributor against the gasket is insufficient, fluid will leak past the gasket. If the sealing pressure is excessively high, the distributor surface and the mating wall, (or the gasket, which is normally made of a resilient material) will be subjected to excessive wear and useful life of the components will be shortened. Therefore, it is necessary to provide the parts to rather close tolerances to insure the proper sealing pressure of the fluid flow distributor on the gasket. Even if the proper sealing pressure is initially attained, wear of the components of the valve eventually results in a loss of fluid sealing and it becomes necessary to readjust the parts to attain the proper sealing. Such readjustment requires disassembling and reassembling parts of the valve, is costly and time-consuming, and difficult to do properly.

It is accordingly an object of the present invention to provide a novel multiport rotary valve design which overcomes the foregoing and related problems by providing a multiport rotary valve having adjustment means which permit rapid and easy adjustment of the fluid flow distributor seating pressure.

It is another object of the present invention to provide a novel multiport rotary valve which includes adjustable bearing means which are quickly and conveniently adjustable to adjust the resistance offered by the bearing means to the seating pressure imposed on the fluid flow distributor, thereby permitting selective adjustment of the latter.

Other objects and advantages of the present invention will become apparent from the following description thereof.

SUMMARY OF THE INVENTION

Objects of the invention are attained in a multiport rotary valve having a combination comprising a body member providing a chamber having, in a wall of the chamber, at least one fluid inlet and at least one fluid outlet opening to the chamber. A fluid distributor is mounted in the chamber for relative rotational movement therein, the distributor having a surface dimensioned and configured to extend along the wall and encircle the fluid inlet and outlet. Biasing means bias the surface of the distributor into fluid sealing contact with the wall of the chamber and an externally accessible handle is rotatably and pivotably mounted on a wall of the body member opposite the first-mentioned wall for rotation to and from different positions and for pivoting of the handle about a pivot point. A bearing surface is on the valve underlying the handle, and connecting means connect the handle to the fluid distributor so that rotation of the handle correspondingly rotates the distributor to and from different positions relative to the at least one inlet and outlet to selectively provide different fluid flow paths via the fluid directing passage between the at least one inlet and outlet, and pivoting of the handle shifts the distributor relative to the first-mentioned wall of the body member to vary the spacing between the dimensioned and configured surface and the first mentioned wall. Adjustable bearing means having a head is adjustably mounted on the handle in a selected position relative thereto in which the head bears on the bearing surface to provide the pivot, the position of the bearing means locating the pivot and thereby serving: (1) to determine the spacing between the surface of the distributor and the first-mentioned wall of the body member and (2) to determine the amount of shifting of the distributor upon movement of the handle, and thereby to set the biasing pressure exerted by the biasing means to effect the fluid sealing contact.

Other objects of the invention are attained by a multiport rotary valve in which the connecting means is a stub shaft projecting from the fluid distributor exteriorly of the body member and the adjustable bearing means are mounted in the handle so that the bearing head projects therefrom, the handle being pivotable about the bearing head to shift the stub shaft and the fluid distributor against the biasing of the biasing means to reduce the pressure of fluid sealing contact between the surface of the distributor and the first-mentioned wall.

Other objects of the invention are attained when the handle is pivotable about an axis which is transversely disposed to the axis of rotation of the handle, and an indented formation is provided on the valve adjacent to the stub shaft, the indented formation being adapted to interlock the handle when it is in its unpivoted position to hold the handle against rotation in a selected one of the different positions, the handle being disengageable from the formation upon pivoting of the handle about its pivot axis to permit rotation of the handle about its axis to rotation of another selected one of the different positions.

DESCRIPTION OF THE PREFERRED EMBODIMENTS

Figure 1:
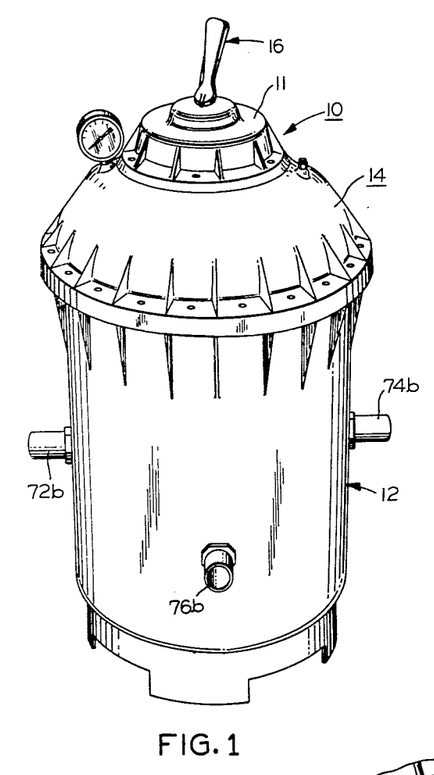
FIG. 1 is a perspective view of a multiport rotary valve embodiment of the present invention shown detachably mounted on a filter tank unit.
Figure 2:
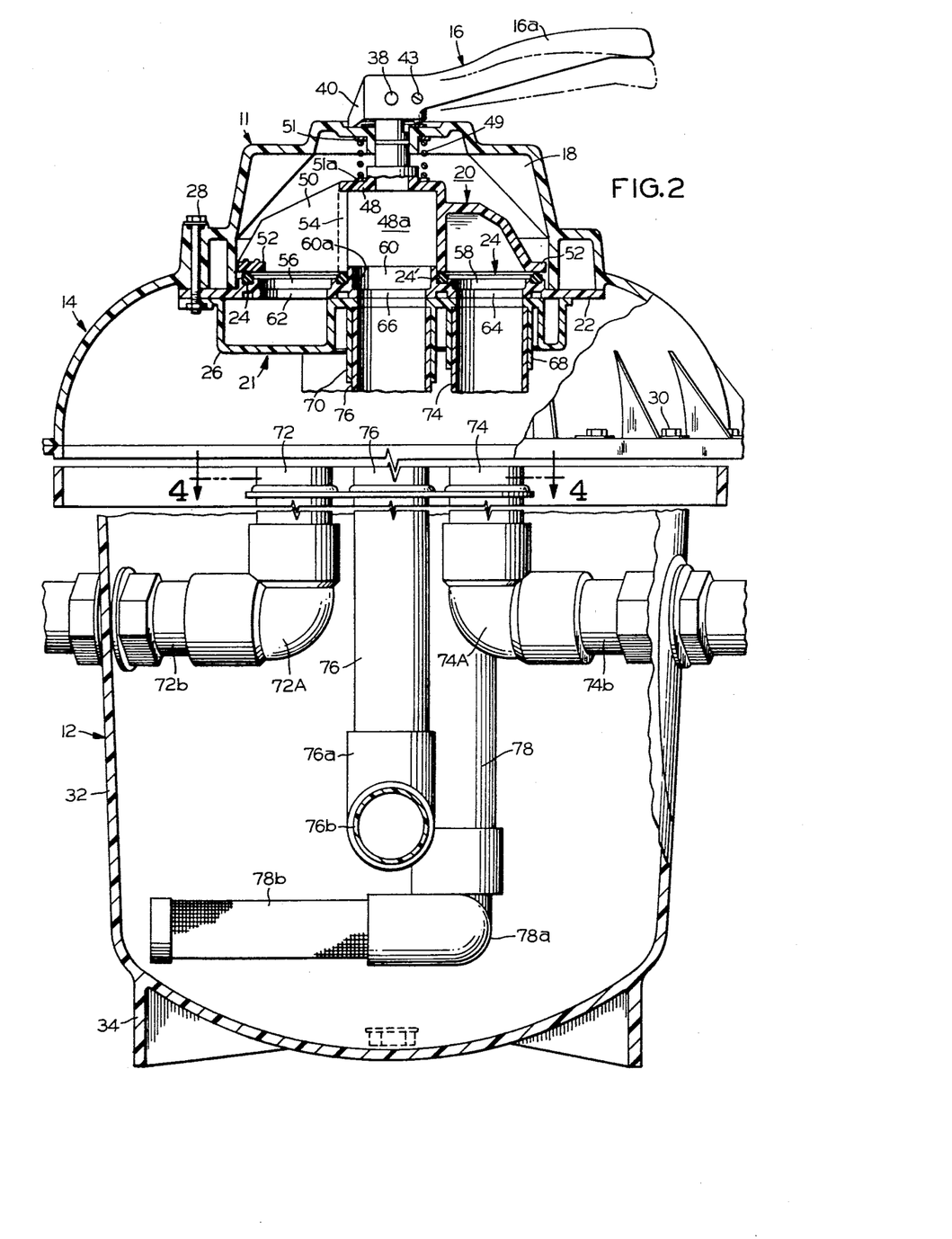
FIG. 2 is a partial sectional view in elevation of the embodiment of FIG. 1.

Referring to the drawings, and more particularly to FIGS. 1 and 2 thereof, there is illustrated a multiport rotary valve shown in an embodiment adapted for use as part of a swimming pool filter tank valve assembly. However, it is to be understood that the valve of the invention is not limited to such use. The multiport rotary valve is generally designated by the numeral 10 and is shown mounted on a filter tank 12. Valve 10 includes a body portion 11 which, in the illustrated embodiment, is integrally formed with a generally domed shaped cover assembly 14.

Referring to FIG. 2, valve 10 has a central chamber portion 18 formed therein in which a fluid distributor 20 is mounted for rotation. Valve 10 includes a wall indicated at 21 which, in the embodiment shown, includes a gasket carrier portion 22 and an end plate portion 26. Gasket carrier 22 supports a gasket 24. Fastening means 28 secures wall 21 to body portion 11 and to cover assembly 14. Mounting means comprising bolts 30 secure cover 14 and its associated valve 10 onto filter tank 12.

As best shown in FIG. 2 of the drawings, the filter tank unit 12 comprises a generally cylindrically shaped tank 32 having a base 34 on which it is supported. The latter base 34 as illustrated in the drawings is formed integrally with the tank 32. However, it is to be understood that, if so desired, the tank 32 and the base 34 could also be formed as separate members which are subsequently secured together by means of any conventional form of fastening means.

Figure 5:
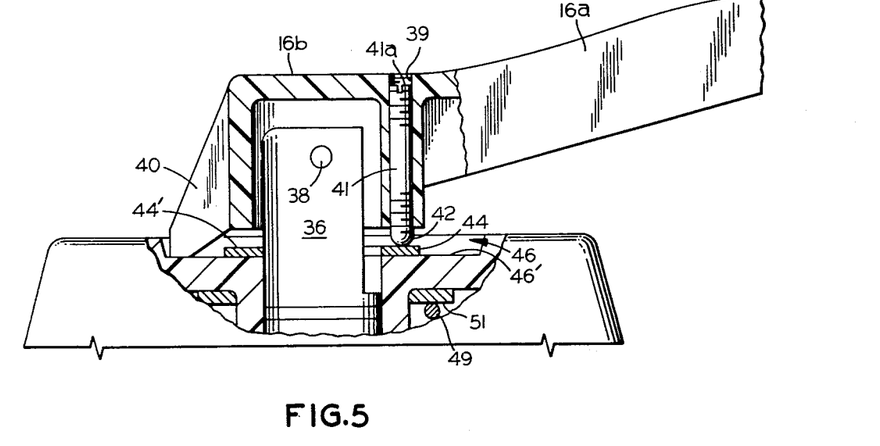
FIG. 5 is a partial section view in elevation of a portion of the embodiment of FIG. 1, shown on a scale which is enlarged relative to that of FIG. 1.
Figure 5A:
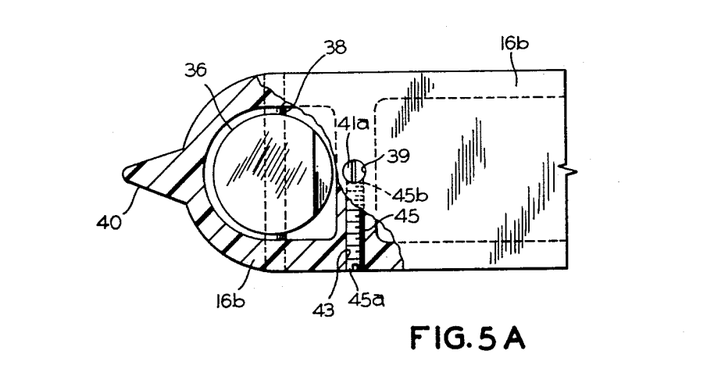
FIG. 5A is a partial plan view of a portion of the embodiment shown in FIG. 5 on a scale which is enlarged relative to FIG. 1.

Referring particularly to FIGS. 2, 5 and 5A of the drawings, handle 16 comprises an elongated member having a hand grip portion 16a thereof which is configured so as to be capable of being readily grasped in one hand by an operator. At one end thereof, handle 16 is provided with a hollow head portion 16b which receives therein a stub shaft 36 which is formed as a part of distributor 20. Handle 16 is attached to stub shaft 36 by suitable means such as by means of a pin 38 which passes through suitable openings (un-numbered) provided for this purpose in both the side walls of head portion 16b of handle 16 and stub shaft 36, whereby handle 16 is capable of pivoting to a limited extent relative to stub shaft 36 about a pivot axis which is transverse to the axis of rotation of handle 16. In addition, handle 16 is provided as illustrated in the drawings at one end thereof with a pointer 40 which cooperates with a series of legends (not shown) provided on the external surface of valve 10 adjacent the path of rotation of handle 16. The legends in association with the pointer 40 provide a means of identifying the particular position that the distributor 20 is in and thereby which path of flow the fluid is following through the valve 10.

Figure 3:
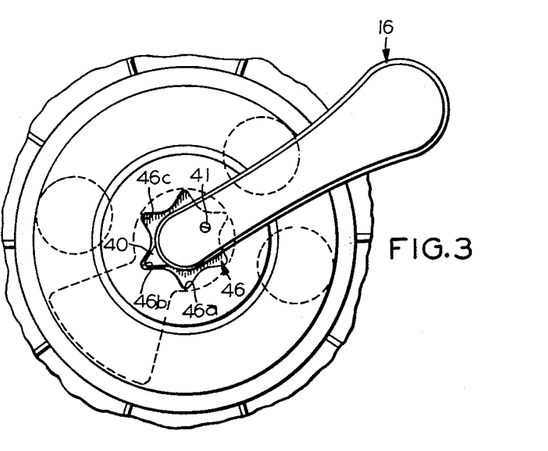
FIG. 3 is a partial plan view of the embodiment of FIG. 1, showing part of the internal construction in dotted outline.

As best seen in FIG. 3, the top of valve 10 is provided with a cut out portion, i.e., a recessed or an indented formation 46 which is configured in the shape of a star, the indentation points 46a, 46b, 46c etc. of which are designed so as to correspond to the shape and dimension of pointer 40 whereby at least a portion of the vertical dimension of pointer 40 is selectively receivable within any one of the indentation points 46a, 46b, 46c, etc. of cut out portion 46, as best appreciated by considering FIGS. 3 and 5 together. This selective engagement of handle 16 by means of its pointer 40 in formation 46 holds handle 16 against rotation about its axis of rotation. When handle 16 is pivoted downwardly about pivot pin 38, pointer 40 is lifted upwardly and free from its engagement within the selected one of indentation points 46a, 46b, 46c, etc. in which pointer 40 had been positioned. Handle 16 is then free to be rotated to another selected position (as indicated by the alignment of pointer 40 with another selected one of indentations 46a, 46b, 46c, etc.) whereby to establish a selected different path of fluid flow through valve 10, as will be more fully described herein below. It will also be appreciated, as shown in FIG. 5, that pointer 40 abuts the depressed horizontal surface of one of the indentations 46a, 46b, 46c, etc. As a result, when adjusting screw 41 is moved downwardly for adjusting purposes, handle 16 is pivoted about pointer 40 to raise pin 38, stub shaft 36, and distributor 20 and thereby adjust sealing pressure.

Referring now particularly to FIGS. 5 and 5A, head portion 16b of handle 16 is seen to have a threaded bore 39 formed therein and within which is threaded adjustable bearing means comprising, in the embodiment shown, an adjusting screw 41 having a slotted end 41a and a hemispherical bearing head 42 at its opposite end. Referring to FIG. 5A, head portion 16b is seen to contain a second threaded bore 43 which is disposed perpendicularly to and intersects with threaded bore 39. A set screw 45 is threadibly received within bore 43 and has a slotted end 45a which is accessible through bore 43. Set screw 45 also has a bearing end 45b which bears against in intermediate shank portion of adjusting screw 41.

Figure 4:
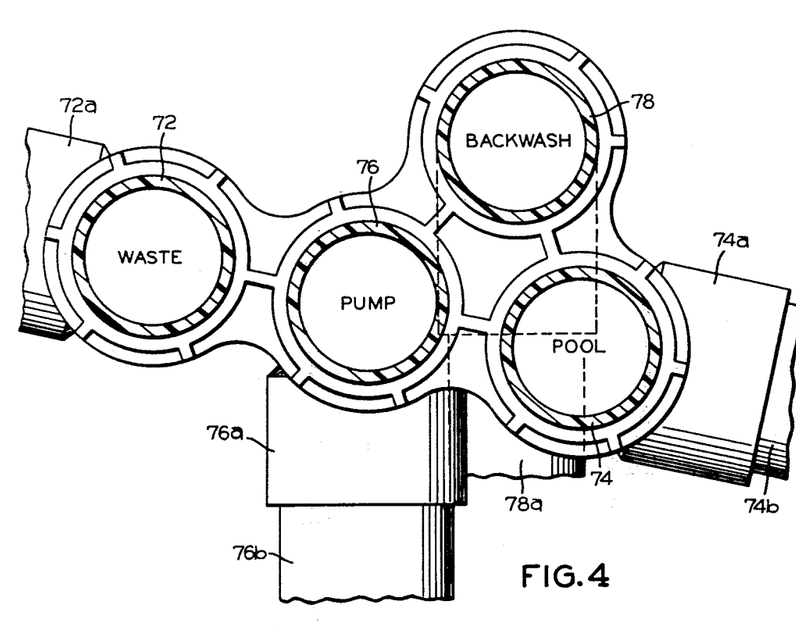
FIG. 4 is a partial view taken along section line 4—4 of FIG. 2.

As best seen in FIG. 4, a washer 44 is received within the recessed or indented formation 46 on the floor 46' thereof formed in the top of body portion 11 of valve 10. Washer 44 provides a bearing surface 44' upon which bearing head 42 is seated, and floor 46' provides a bearing support surface. Obviously, washer 44 could be dispensed with and the bearing surface provided by floor 46'.

As best seen with reference to FIGS. 2 and 3, distributor 20 is positioned within central chamber portion 18 of valve 10 and, as previously described, includes a stub shaft 36 affixed thereto and operatively connected to handle 16 whereby rotation of handle 16 correspondingly rotates distributor 20. Distributor 20 has a hub 48 having a hollow interior 48a from which a plurality of ribs 50 extend radially outwardly into slightly spaced relation relative to the inner side walls of central chamber 18. The ends of ribs 50 are interconnected by means of a bottom plate 52 which, in the embodiment illustrated, is integrally formed as a part of distributor 20. Bottom plate 52 provides a surface of distributor 20 which surface is dimensioned and configured to extend along wall 21 and enclose the fluid inlet and outlets described below. An opening 54 is formed in one of the walls of hub 48 to provide a through passage from hollow interior 48a of hub 48 to the exterior of distributor 20.

Gasket carrier 22 and end plate 26 of wall 21 are seen to abut body portion 11 and seal off chamber 18 at the lowermost portion thereof, wall 21 serving to define chamber 18. Gasket carrier 22 is substantially circular in plan profile to provide a plate like construction in which a number of flanged circular openings are formed to provide a fluid inlet and fluid outlets opening to chamber 18. For example, circular openings 56 and 58 comprise outlet ports opening to chamber 18, and circular opening 60 comprises an inlet port opening thereto. Circular openings 56, 58, and 60 are of flanged construction, circular opening 60 being located in the geometric center of gasket carrier 22, and openings 56 and 58 being located on opposite sides of opening 60 and substantially diametrically opposite each other. A fourth circular opening, not visible in FIG. 2, is also provided in gasket carrier 22 as will be described hereinbelow.

Gaskets 24 have raised lip portions including peripheral lip 24 which is circular in plan view (not shown) so as to receive the circumferential edge portion of bottom plate 52 thereon to maintain a sealing engagement therewith. Gasket 24 generally has a shape conforming to that required to provide fluid sealing about circular openings 56, 58, and 60 in gasket carrier 22.

End plate 26 is generally circular in plan view (not shown) and has four circular openings therein which correspond with the circular openings in gasket carrier 22. For example, circular opening 62 corresponds to and is aligned with circular opening 56 of gasket carrier 22, and circular openings 64 and 66 similarly correspond, respectively, with circular openings 58 and 60 of gasket carrier 22. The pairs of aligned corresponding openings cooperate to define respective inlet and outlet openings when end plate 26 is mounted in abutting relation to gasket carrier 22 as illustrated in FIG. 2 of the drawings. A corresponding circular opening (not shown) in end plate 26 is in alignment with the fourth circular opening (not shown) in gasket carrier 22.

Each of the circular openings in end plate 26 has vertically depending tubular sleeve like members depending downwardly therefrom, only two of which (sleeves 68 and 70 associated, respectively, with circular openings 64 and 66) are shown in FIG. 2 for clarity of illustration. The lengths of the downwardly depending tubular sleeve members are such that the sleeves extend beyond the lower surface of end plate 26. These sleeve members are adapted to form a fluid flow connection with, respectively, conduits 72, 72, 76, and 78, the plan view disposition of which is shown in FIG. 4. Conduit 72 is connected with the sleeve (not shown) associated with circular opening 62, conduit 74 is connected to sleeve 68 associated with circular opening 64, conduit 76 is connected with sleeve 70 associated with circular opening 66, and conduit 78 is connected with the sleeve and circular opening (not shown) comprising the fourth circular opening in end plate 26 and gasket carrier 22. Elbows 74a, 74a, 76a, and 78a connect their associated conduits, respectively, to connecting conduits 72b, 74b, 76b, and 78b. Conduit 78b in the embodiment shown comprises an underdrain comprising a short tubular member having perforated side walls whereby fluid may flow therethrough. Connecting conduit 72b passes through an opening formed in tank 32 and leads to a waste water discharge. Connecting conduit 74b passes through an opening in the opposite side of tank 32 and leads, for example, to the inlet water supply of a swimming pool. Connecting conduit 76b also passes through tank wall 32 (not shown) and comprises an inlet which supplies water via elbow 76a and conduit 76 into multiport rotary valve 10 for selective distribution, as need requires, among outlet conduits 72, 74, and 78.

Those skilled in the art will recognize that the particular utilization of the multiport rotary valve illustrated, i.e., as a valve associated with swimming pool water equipment, would call for integral tank 32 to conventionally be filled with some form of filtering material, for example, sand. For clarity, the filtering material is not shown in the drawings.

Referring particularly to FIG. 2, a coil spring 49 surrounds stub shaft 36. Coil spring 49 is interposed between the inner surface of the top of body portion 11 and the outer surface of the top of hub 48 of distributor 20, whereby distributor 20 is biased in a downwardly (as viewed in FIG. 2) position so that the contoured and configured surface of bottom plate 52 bears against the corresponding portions of gasket 24 in fluid sealing engagement therewith. Coil spring 49 thus provides a resilient biasing means to bias fluid distributor 20 in fluid sealing engagement against wall 21. Suitable bearing surfaces 51 and 51a are provided to receive thereon the opposite ends of coil spring 49. Coil spring 49 also biases pointer 40 into abutment with one of the horizontal surface of one of the indentations 49a, 49b, 49c, etc.

Circular opening 60 of gasket carrier 22 is seen to have a raised circular rib portion 60a which extends upwardly into the interior 48a of hub 48 of distributor 20. Distributor 20 is therefore mounted on gasket 24 and gasket carrier 22 in fluid tight sealing relationship which is maintained by resilient biasing means comprised, in the embodiment illustrated, of coil spring 49.

In operation, with valve 10 mounted in place and connected to the various conduits as described above, input fluid such as water to be supplied to a swimming pool is fed to conduit 78b and flows through conduit 76 through circular openings 66, 60 into hollow interior 48a of hub 48 of distributor 20. Fluid flows through opening 54 provided in distributor 20 and then into chamber portion 18 of valve 10. After reaching central chamber portion 18 of valve 10 the fluid is directed downwardly by distributor 20 to a selected one of the other openings, for example, circular openings 56, 62, 58, or 64, depending upon the selected position in which handle 16 and consequently fluid distributor 20 is positioned. Thus, fluid flow is selectively directed to the selected one of conduits 72, 74, or 78.

Accidental dislodgement of handle 16 from its preselected position is prevented by bearing head 42 of adjusting screw 41 seated upon bearing surface 44'. When it is desired to select a different fluid flow path of the fluid from the inlet to another one of the outlet conduits, the operator grasps handle 16 by its hand grip portion 16a and pivots handle 16 so that hand grip portion 16a is pivoted downwardly about pin 38. This raises pointer 40 sufficiently to clear the indentation points 46a, 46b, or 46c, etc. and permits selective rotation of distributor 20. Circumferential edge portions of bottom plate 52 slideably rotate along ring gasket 24 as distributor 20 is rotated. The contact of bearing head 42 with bearing surface 44' provides a pivot point about which handle 16 is pivoted to lift stub shaft 36 and consequently fluid distributor 20. Fluid distributor is thus slightly lifted relative to gasket carrier 22 by stub shaft 36 during the rotation of distributor 20. This lifting action lessens the fluid sealing pressure between distributor 20 and wall 21 to a selected suitable value to permit smooth and easy rotation of the valve without undue wear on gasket 24. Since pointer 40 abuts the horizontal surface of one of the indentations 49a, 49b, 49c, etc., the location of the point of contact between bearing head 42 and bearing surface 44' relative to the point of contact between the surface provided by bottom plate 52 and gasket 24 of wall 21 determines the amount of fluid sealing pressure imposed by the biasing means provided by coil spring 49. With prior art embodiments, this required very close tolerances in dimensions and assembly of the valve. With the valve of the invention, since adjusting screw 41 permits selective threadible adjustment of the location of the bearing point provided by bearing head 42, greater tolerance in dimensions of parts and assembly is permitted, with tolerance errors being correctable by simple adjustment of adjusting screw 41 by turning thereof with a screw driver by use of slotted end 41a. More importantly, as parts of the valve wear in use, particularly as washer 42 wears, adjustment of the bearing means provided by adjusting screw 14 enables ready compensation for wear of the parts. Thus, as washer 44 wears down, the point of contact of bearing head 42 with washer 44 moves slightly closer to the interface between gasket 24 and bottom plate 52 of distributor 20. As the washer becomes thinner, the pressure imposed by spring 49 on gasket 24 increases and fluid distributor 20 is not lifted sufficiently when handle 16 is pivoted about pin 38, with the result being not only difficulty in rotating the valve, but excessive wear on gasket 24 which can destroy the gasket. This is particularly so if, as is often the case, abrasive particulate impurities are contained in the fluid passing through the valve. This situation is readily overcome with the valve of the invention, simply by loosening set screw 45, and advancing adjusting screw 41 to move its bearing head 42 further out of handle 16, towards bearing surface 44' a suitable distance to compensate for the wear, and re-tightening screw 45. This sets the spacing between the dimensioned and configured surface of bottom plate 52 and wall 21 back to its proper value, thus compensating for wear of washer 44. It also, when handle 16 is pivoted downwardly to rotate the valve, determines the proper amount of shifting of distributor 20 upwardly (as viewed in FIG. 2) to set to the selected suitable value the biasing pressure exerted by the biasing means to effect the fluid sealing contact.

On the other hand, if the washer 44 is too thick, the pressure imposed by coil spring 49 on gasket 24 is too low and excessive leakage results. This is overcome by moving adjusting screw back into handle 16 to increase the bearing pressure effecting fluid sealing.

It will be appreciated from the foregoing that the adjustable bearing means provides a simple and inexpensive means of adjusting to desired values the bearing pressure imposed by the biasing means. Simple adjustment of the adjustable bearing means obviously provides great improvement over prior art devices in which, to facilitate a corresponding adjustment, the valve would have to be disassembled, and washer 44 replaced or shimmed to provide proper operation of the valve. Obviously, other equivalent means to provide an adjustable bearing means are contemplated by the invention.

Having thus described the invention, I claim:

1. In a multiport rotary valve, the combination comprising:
   a. a body member providing a chamber therein and having in a wall thereof defining said chamber at least one fluid inlet and at least one fluid outlet opening to said chamber;
   b. a fluid distributor mounted in said chamber for relative rotational movement therein, said distributor having a surface dimensioned and configured to extend along said wall and enclose said at least one fluid inlet and outlet, said fluid distributor providing a fluid directing passage opening at said distributor surface;
   c. resilient sealing means provided on at least one of said fluid-distributor surface and said wall of said body member;
   d. biasing means applying a biasing force to said fluid distributor to press said sealing means between said surface of said distributor and to effect a seal between said distributor surface and said chamber wall, the spacing between said distributor surface and said chamber wall thereby determining the force on said resilient sealing means;
   e. an externally accessible handle rotatably and pivotably mounted relative to a wall of said body member opposite said first-mentioned wall for rotation of said handle to and from different positions and for pivoting of said handle about a pivot point;
   f. a bearing surface on said valve underlying said handle;
   g. connecting means connecting said handle to said fluid distributor for rotation of said fluid distributor, upon rotation of said handle, to and from different positions relative to said at least one inlet and outlet to selectively provide different fluid flow paths via said fluid directing passage between said at least one inlet and outlet, said pivoting of said handle shifting said distributor relative to said first mentioned wall of said body member to vary the spacing between said surface of said distributor and said first mentioned wall and thereby the force on said sealing means; and
   h. adjustable bearing means having a head and being adjustably mounted on said handle in a selected position relative thereto in which said head bears on said bearing surface to provide said pivot point, the position of said bearing means locating said pivot point and thereby serving: (1) to determine the spacing between said surface of said distributor and said first mentioned wall of said body member, thereby to set the force of said sealing means, and (2) to determine the amount of shifting of said distributor upon ivoting movement of said handle.

2. The multiport rotary valve of claim 1 wherein said connecting means comprises a stub shaft projecting from said fluid distributor exteriorly of said body member, said handle is pivotably connected to said stub shaft and is pivotable about a pivot axis which is transversely disposed to the axis of rotation of said handle, and said adjustable bearing means are mounted so that said bearing head projects from said handle, pivoting of said handle about said pivot point serving to shift said stub shaft and thereby said fluid distributor against said biasing of said biasing means to reduce said force on said sealing means.

3. The multiport rotary valve of claim 2 further including an indented formation on said valve adjacent said stub shaft, said indented formation being adapted to interlock said handle when said handle is in its unpivoted position to hold said handle against rotation in a selected one of said different positions, said handle being disengageable from said formation upon pivoting of said handle about said pivot axis to permit rotation of said handle about its axis of rotation to another selected one of said different positions.

4. The multiport rotary valve of claim 1 wherein said body member has an exterior surface and said bearing support surface is provided by said body member exterior surface.

5. The multiport rotary valve of claim 4 wherein said handle has a hand grip portion and a head portion and is pivotably connected between its hand grip portion and its handle portion to said stub shaft, and further including an indented formation on said valve adjacent said connecting means and adapted to interlock said head portion of said handle, said head portion being disengageable from said formation upon said pivoting of said handle about said pivot axis.

6. The multiport rotary valve of claim 2 wherein said adjustable bearing means is an adjusting screw threadibly received within said handle.

7. The multiport rotary valve of claim 6 wherein one end of said adjusting screw provides said bearing head and the other end of said adjusting screw is configured to facilitate rotation thereof to select said effective position of said adjusting screw.

8. The multiport rotary valve of claim 2 wherein said biasing means comprises a spring means interposed between said fluid distributor and an interior wall of said chamber.

9. The multiport rotary valve of claim 8 wherein said spring means is a coil spring surrounding said stub shaft, one end of said coil spring bearing against said fluid distributor and the other end bearing against an inner wall of said chamber.

10. The multiport rotary valve of claim 1, wherein there is one fluid inlet and a plurality of fluid outlets in said first mentioned wall.

11. The multiport rotary valve of claim 10 wherein there is one fluid inlet and three fluid outlets in said first mentioned wall.

12. The multiport rotary valve of claim 2 wherein there is one fluid inlet and a plurality of fluid outlets in said first mentioned wall.

13. The multiport rotary valve of claim 1 wherein said connecting means comprises means projecting from said fluid distributor exteriorly of said body member, and said adjustable bearing means are mounted on said handle so that said bearing head projects therefrom between said handle and said wall of said chamber opposite said first mentioned wall, said handle being pivotable about said bearing head to shift said connecting means and said fluid distributor against said biasing of said biasing means to reduce said force on said sealing means.

14. The multiport rotary valve of claim 13 further including indicia on said valve adjacent said handle, said indicia being adapted to indicate the position of said handle relative to said different positions.

15. The multiport rotary valve of claim 13 wherein said handle is pivotably connected to said connecting means whereby said handle is pivotable about a pivot axis which is transversely disposed to the axis of rotation of said handle, and further including a formation on said valve adjacent said connecting means, said formation being adapted to engage said handle when said handle is in its unpivoted position to hold said handle against rotation in a selected one of said different positions, said handle being disengageable from said formation upon pivoting of said handle about said pivot axis to permit rotation of said handle about its axis of rotation to another selected one of said different positions.

* * * * *

UNITED STATES PATENT AND TRADEMARK OFFICE
CERTIFICATE OF CORRECTION

PATENT NO. : 4,216,798
DATED : August 12, 1980
INVENTOR(S) : Georg W. Tscherner

It is certified that error appears in the above-identified patent and that said Letters Patent are hereby corrected as shown below:

Column 8, line 28, after "and" insert -- said wall of said chamber"

Column 8, line 62, "ivoting" should be -- pivoting --

Signed and Sealed this

Ninth Day of December 1980

[SEAL]

Attest:

SIDNEY A. DIAMOND

Attesting Officer    Commissioner of Patents and Trademarks